United States Patent
Itatani

(10) Patent No.: US 8,349,971 B2
(45) Date of Patent: Jan. 8, 2013

(54) 6,6-POLYIMIDE COPOLYMERS AND PROCESSES FOR PREPARING THEM

(75) Inventor: Hiroshi Itatani, Ushiku (JP)

(73) Assignees: Solpit Industries, Ltd. (JP); Sojitz Corporation (JP)

( * ) Notice: Subject to any disclaimer, the term of this patent is extended or adjusted under 35 U.S.C. 154(b) by 149 days.

(21) Appl. No.: 12/665,197

(22) PCT Filed: Jun. 18, 2007

(86) PCT No.: PCT/JP2007/062247
§ 371 (c)(1),
(2), (4) Date: Jun. 9, 2010

(87) PCT Pub. No.: WO2008/155811
PCT Pub. Date: Dec. 24, 2008

(65) Prior Publication Data
US 2010/0273955 A1    Oct. 28, 2010

(51) Int. Cl.
*C08G 73/10* (2006.01)

(52) U.S. Cl. ........ 525/432; 525/431; 525/436; 528/350; 528/353

(58) Field of Classification Search .................. 525/431, 525/432, 436; 528/350, 353
See application file for complete search history.

(56) References Cited

U.S. PATENT DOCUMENTS

| | | | |
|---|---|---|---|
| 4,395,572 | A | 7/1983 | Chan |
| 5,202,411 | A | 4/1993 | Itatani |
| 5,202,412 | A | 4/1993 | Auman et al. |
| 5,502,143 | A | 3/1996 | Oie et al. |
| 6,627,131 | B2 | 9/2003 | Huber |
| 2005/0272907 | A1 | 12/2005 | Jin et al. |
| 2006/0004180 | A1 | 1/2006 | Itatani |
| 2007/0106056 | A1 | 5/2007 | Itatani |

FOREIGN PATENT DOCUMENTS

| | | |
|---|---|---|
| JP | 2007157560 | 6/1995 |
| JP | H0715760 | 6/1995 |
| JP | 2001261824 A | 9/2001 |
| WO | 03060010 A1 | 7/2003 |
| WO | 2004035689 A1 | 4/2004 |
| WO | 2004087793 A1 | 10/2004 |

*Primary Examiner* — Ana Woodward
(74) *Attorney, Agent, or Firm* — The Webb Law Firm

(57) ABSTRACT

The present invention provides a process for preparing a solvent-soluble polyimide copolymer synthesized from a 6,6-imide segment having an imide oligomer with PMDA at both ends produced by adding 4 molar equivalents of pyromellitic dianhydride (PMDA) and 2 molar equivalents of diaminotoluene (DAT) to an imide oligomer produced by heating 1 molar equivalent of biphenyltetracarboxylic dianhydride (BPDA) and 2 molar equivalents of diaminodiphenyl ether (DADE) at 160-200° C. in the presence of a catalyst in an organic polar solvent.

1 Claim, No Drawings

6,6-POLYIMIDE COPOLYMERS AND PROCESSES FOR PREPARING THEM

TECHNICAL FIELD

The present invention relates to 6,6-polyimide copolymer compositions having pyromellitic dianhydride, biphenyltetracarboxylic dianhydride, diaminodiphenyl ether, diaminotoluene and other aromatic diamine and tetracarboxylic dianhydride, and processes for preparing them.

Cyclized/crosslinked polyimides consisting of a tetramine 1,4-bis(3,5-diaminobenzoyl) piperazine and the components above were synthesized. The present invention also relates to novel composite polyimides formed by combining such a polyimide with a linear polyimide.

BACKGROUND ART

A polyimide film consisting of pyromellitic dianhydride (called PMDA) and diaminodiphenyl ether (called DADE) was manufactured under the name of KAPTON by DuPont in 1960.

On the other hand, a polyimide film called "Upilex" synthesized from biphenyltetracarboxylic dianhydride (called BPDA) and p-phenylenediamine (called PPD) was manufactured by Ube Industries, Ltd. in 1980.

These are widely used as super heat-resistant polymers having good electrical insulating properties, mechanical properties and chemical resistance and characterized by a glass transition temperature of 420° C. or more and a thermal decomposition onset temperature of 500° C. or more.

((1) Reference: D. Wilson et al; Polyimide, Blackie, New York (1990)).

No alternative super heat-resistant polyimide film to these has ever been marketed since.

These heat-resistant polyimides are less soluble in solvents so that they cannot be directly synthesized in solution. Thus, a conventional method involves preparing a high-viscosity (therefore, high-molecular weight) compound of an intermediate polyamic acid and then casting and heating it to 400° C. or more to form a film via an imidation reaction while removing the solvent, but the film-forming speed is low. If a third component is added to the polyamic acid solution, an exchange interaction occurs to produce a random copolymer, which is difficult to modify.

No alternative polyimide films to KAPTON and Upilex are commercially available at present. No solvent-soluble block copolymerized polyimide containing components such as PMDA, DADE, BPDA and PPD has been developed.

DISCLOSURE OF THE INVENTION

Problems to be Solved by the Invention

A method for preparing a polyimide film directly from a solvent-soluble polyimide is adopted instead of the conventional method for preparing a polyimide film via a polyamic acid. Solvent-soluble block copolymerized polyimides have been synthesized by using a method for synthesizing a block copolymer via sequential reactions. However, any solvent-soluble block copolymerized polyimide containing the four components, i.e., BPDA, PMDA, DADE and DAT has not been obtained by this method. U.S. Pat. Nos. 5,202,411; 5,202,412; 6,627,377.

In the preparation of solvent-soluble polyimides by using acid catalysts, the resulting polyimides had to be separated from the catalysts (U.S. Pat. No. 4,395,527).

Means to Solve the Problems

Initially, a process eliminating catalyst separation was developed (U.S. Pat. No. 5,502,143 (1996)). A catalyst based on lactone equilibrium was used, i.e., an additive consisting of γ-valerolactone and pyridine (or N-methylmorpholine) was used as a catalyst. This additive acts as a catalyst by forming an [acid] [base] system in the presence of water. As water in the solution is removed at the end of the reaction, it returns to [lactone] and [base] and is removed from the system.

The solvent used for the reaction may not be anhydrous. A solvent containing 500 ppm water can be advantageously used.

Solvent-soluble polyimides can be converted into multicomponent block copolymerized polyimides by sequential reactions. A film can be formed at a low temperature of 350° C. or less by casting and heating a polyimide solution. The film-forming speed advantageously increases because no imidation reaction is needed during film formation.

A block polyimide containing these four components was synthesized by sequential reactions, but a solvent-soluble polyimide could not be obtained.

A novel three-step polymerization reaction was invented, whereby the block polyimide containing these four components turned solvent-soluble. Thus, a (BPDA+2DADE) component is heated to give an imide oligomer at a first stage. Then, a (4PMDA+2DAT) component is added to synthesize a 6,6-imide segment having PMDA at both ends. Finally, a (PMDA+2DAT) component is added and the mixture is heated with stirring to give a solvent-soluble block copolymerized polyimide.

ADVANTAGES OF THE INVENTION

Diaminotoluene contained in solvent-soluble 6,6-polyimide copolymers consisting of pyromellitic dianhydride, biphenyltetracarboxylic dianhydride, diaminodiphenyl ether and diaminotoluene was replaced by another aromatic diamine to synthesize functional 6,6-polyimide copolymers. Reaction-type and mixed-type polyimide composite of a 6,6-polyimide copolymer and a cyclized/crosslinked polyimide were synthesized to produce super heat-resistant polyimide films. Especially, the polyimide composite shows excellent properties in craze resistance, adhesion, size stability, low dielectric constant and gas permeability.

THE MOST PREFERRED EMBODIMENTS OF THE INVENTION

Solvents used for polymerization include N-methylpyrrolidone, dimethylacetamide, dimethylformamide and sulfolane. Especially, N-methylpyrrolidone (called NMP) was used.

Polyimides showing the composition PMDA-DADE are especially less soluble in solvents. Thus, a process for synthesizing a polyimide copolymer was designed to avoid the formation of DADE-PMDA-DADE and PMDA-DADE-PMDA bonds primarily responsible for insolubility.

Thus, a polyimide polymer was synthesized by heating a (BPDA+2DADE) component at 180° C. in the presence of a catalyst to give an imide oligomer having DADE at both ends, then adding a (4PMDA+2DAT) component and stirring the mixture at room temperature to synthesize a 6,6-imide segment having PMDA at both ends, and as a third step reaction, adding a (PMDA+2DAT) component and heating the mixture at 180° C. with stirring to synthesize the polyimide polymer.

The resulting polyimide is solvent-soluble and stable and remains in a liquid state after standing at room temperature for a long period.

It has the following composition:
{(2PMDA+DAT) (BPDA+2DADE) (2PMDA+DAT) (PMDA+2DAT)}n.

To modify this soluble polyimide, an acid dianhydride (called A) and an aromatic diamine (called B) were added at the third step to synthesize a catalyst-soluble 6,6-polyimide:
{(BPDA+2DADE) (4PMDA+2DAT) (A+2B)}n.

Acid dianhydrides (A) that can be used include PMDA, BPDA, 3,3',4,4'-benzophenone tetracarboxylic dianhydride, oxybiphenyltetracarboxylic dianhydride, 2,2-bis(3,4-dicarboxyphenyl) hexafluoropropane dianhydride (6FDA) and bicyclo(2,2,2) oct-7-ene-2,3,5,6-tetracarboxylic dianhydride (BCD).

Various diamines (B) that can be used include 1,3-bis(3-aminophenoxy)-benzene, 1,3-bis(4-aminophenoxy)-benzene, bis(3-aminophenoxy) sulfone, trifluoromethyl-2,2,2-trifluoroethylidine, -3,3'-diaminobenzene, trifluoromethyl-2,2,2-trifluoroethylidine-(3,3'-diamino-4,4'-dihydroxy) biphenyl, bis (3-amino-4-hydroxy) phenylsulfone, 2,4-diaminodiphenyl ether, 9,9-bis(4-aminophenyl) fluorene, 3,5-diaminobenzoic acid, diaminotoluene and diaminosiloxane. Diaminosiloxane has the following composition:

Various diamines (B) that can be used include bis(3-aminophenoxy)-1,3-benzene, bis(4-aminophenoxy)-1,3-benzene, bis(3-aminophenoxy) sulfone, trifluoromethyl-2,2,2-trifluoroethylidine-3,3'-diaminobenzene, trifluoromethyl-2,2,2-trifluoroethylidine, (3,3'-diamino-4,4'-dihydroxy) benzene, bis(3-amino-4-hydroxy) phenylsulfone, 2,4-diaminodiphenyl ether, 9,9'-bis(4-aminophenyl) fluorene, 3,5-diaminobenzoic acid, diaminotoluene and diaminosiloxane. Diaminosiloxane has the following composition:

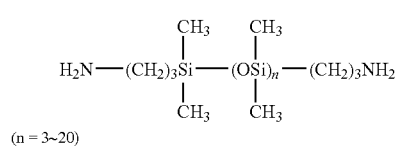

(n = 3~20)

In the Examples below, the molecular weights of the produced soluble polyimides were determined by GPC at the end of the reaction.

Number average molecular weight (Mn), weight average molecular weight (Mw), Z-average molecular weight (Mz), and Mw/Mm and Mz/Mn ratios are shown. Glass transition temperature (Tg) and thermal decomposition onset temperature (Tm) determined by thermal analysis are also shown.

These polyimides can be used as products similar to conventional heat-resistant polyimide products. They can be used as aerospace materials, components for vehicles, electric/electronic components and semiconductor materials because of their heat resistance, electrical insulating properties, mechanical strength and chemical resistance.

Polyimide copolymers modified with a different diamino component especially have electrodepositability, photosensitivity and adhesiveness so that they can be used as copper-clad printed circuit boards, photoresist moldings, etc.

They can be widely used as construction materials, medical materials, substitutes for Teflon™, and heat-resistant materials for household utensils because of their readily available raw materials, low cost and improved preparation process.

Cyclized/Crosslinked Polyimides

Cyclized/crosslinked polyimides prepared from tetramines were already reported (PCT/JP2004/004305, Hiroshi Itatani).

In the present report, cyclized/crosslinked polyimides using 1,4-bis(3,5-diaminobenzoyl) piperazine (called BDP) as a tetramine were examined.

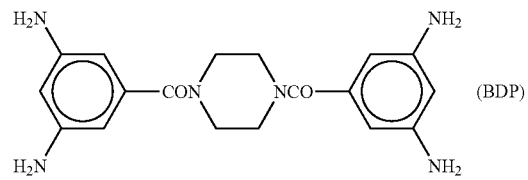

BDP reacts with PMDA, BPDA, DADE and DAT to produce cyclized/crosslinked polyimides.

A (BDP+4BPDA+4DADE) component is heated at 180° C. in the presence of a lactone catalyst in a polar solvent to give an imide oligomer. To this solution is added a (8PMDA+4DAT) component, and the mixture is heated at 180° C. with stirring. Finally, a (2BPDA+4DAT) component is added and the mixture is heated at 180° C., whereby a solvent-soluble cyclized/crosslinked polyimide can be synthesized by three-step addition.

{(BDP+4BPDA+4DADE) (8PMDA+4DAT) (2BPDA+4DAT)}n

As the reaction proceeds, the cyclized/crosslinked polyimide shows a higher molecular weight and a wider molecular weight distribution with increasing crosslinking degree, thus a higher Mw (weight average molecular weight)/Mn (number average molecular weight) ratio, and finally it becomes gelled.

It remains in a solution state during the reaction at a weight average molecular weight of 100,000, but it becomes gelled and solidifies after standing at room temperature for a long period. When it is heated again, it returns to a solution.

This cyclized/crosslinked polyimide can be converted into a functional polyimide by replacing the diamino component by another aromatic diamine (C).

A functional cyclized/crosslinked polyimide can be obtained by heating a {(BDP+4BPDA+4DADE) component at 180° C. with stirring to give an imide oligomer, and then adding a (4PMDA+2C) component and heating the mixture at 180° C. with stirring.

{(BDP+4BPDA+4DADE) (4PMDA+2C)}n.

The same results are obtained by the reaction as follows:

{(BDP+4PMDA+2DAT) (4BPDA+2C)}n.

Aromatic diamines (C) that can be used include diaminotoluene, diaminobenzoic acid, 1,3-bis(3-aminophenoxy)-benzene, 1,4-bis(3-aminophenoxy)-benzene, bis(3-aminophenoxyphenyl)sulfone, 9,9-bis(4-aminophenyl) fluorene, bis(3,3'-diamino-4,4'-dihydroxyphenyl) sulfone, other fluorinated diamines, etc.

Although the molecular structures of these cyclized/crosslinked polyimides have not been established, polymerization models of cyclized/crosslinked polyimides were designed.

Synthesis of Cyclized/Crosslinked Polyimide

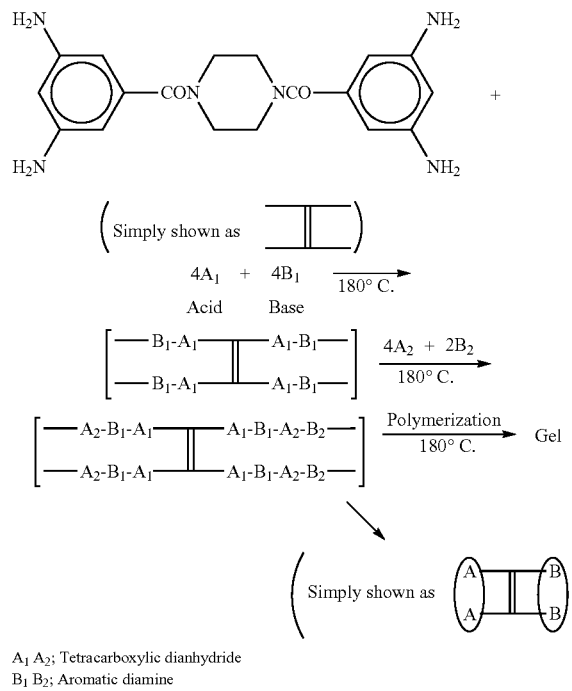

$A_1$ $A_2$; Tetracarboxylic dianhydride
$B_1$ $B_2$; Aromatic diamine

Polymerization Models

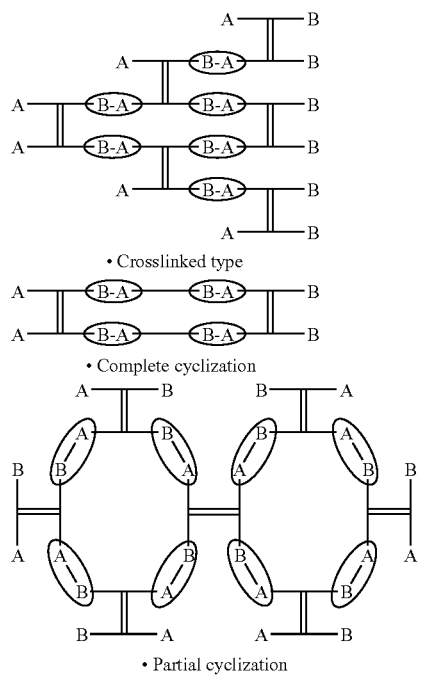

- Crosslinked type
- Complete cyclization
- Partial cyclization

If a cyclized/crosslinked polyimide solution is left at room temperature for a long period, it becomes gelled and then solidifies. Thus, it is difficult to use as it is. However, it was found that cyclized/crosslinked polyimides remain in a liquid state at room temperature for a long period if they coexist with linear polyimides. In other words, cyclized/crosslinked polyimides can be used as industrial materials in the form of composite materials with liner polyimides.

For example, a linear polyimide and a gelled cyclized/crosslinked polyimide are mixed and stirred at 100-150° C. to give a homogeneous solution that can remain in a liquid state at room temperature for a long period.

Such copolymers are called mixed-type polyimide composite (or mechanically mixed polyimide copolymers).

On the other hand, reactions for producing cyclized/crosslinked polyimides were performed in solutions of linear polyimides. In this case, the products can also be stored at room temperature for a long period.

These copolymers are called reaction-type polyimide composite (or mixed reaction type polyimide copolymers).

Silicone diamine-containing cyclized/crosslinked polyimides were synthesized. These are highly adhesive polymers. As shown in Examples 13, 15 and 16, it is difficult to analyze their glass transition temperatures. However, glass transition temperatures clearly appear when they are mixed with linear polyimides to form mixed-type polyimide composite or reaction-type polyimide composite.

In the Examples below, the molecular weights of the produced polyimides were determined.

Number average molecular weight Mn; weight average molecular weight Mw; Z-average molecular weight Mz; Mw/Mn ratio and Mz/Mw ratio are shown.

As shown in Examples 19 and 20, the molecular weights Mn, Mw, Mz, and Mw/Mn ratios of reaction-type composite do not significantly differ from those of the linear polyimide from which they are derived.

However, a mechanically mixed polyimide complex shows a very higher Mw/Mn (=7.73) and a lower number average molecular weight, as compared with Mw/Mn=2.16 and Mw/Mn=2.11 respectively in the linear polyimide and the cyclized/crosslinked polyimide from which it is derived, as shown in Example 21.

These results suggest that a linear polyimide and a crosslinked polyimide are entangled in mixed-type polyimide composite. In reaction-type polyimide composite, a linear polyimide and a cyclized/crosslinked polyimide appear to coexist.

In view of the difference between mixed-type polyimide composite and reaction-type polyimide composite as described above, mixed-type polyimide composite form composite polyimides entangled with each other. In reaction-type polyimide composite, a linear polyimide and a cyclized/crosslinked polyimide are presumed to coexist in a molecular proportion of 4:1 without being entangled with each other. Solutions of reaction-type polyimide composite gave highly elastic films with smooth surfaces, good size stability and high adhesiveness.

Films of both type polyimide composite dried at 180° C. for 2 hours showed deterioration in a PCT test (in saturated vapor at 120° C. for 48 hours), but films heated at 220° C. for 2 hours passed the PCT test and showed no deterioration.

Reaction-type polyimide composite has better properties as compared with linear polyimides such as craze resistance, smoothness, size stability, low dielectric constant and gas permeability of films.

The following examples illustrate the present invention without, however, limiting the invention solely thereto since polyimides having different characteristics are obtained depending on the combination of various aromatic diamines.

EXAMPLES

Molecular weight determination of the polyimides shown in the Examples below was performed as follows: A part of the reaction solution was diluted with dimethylformamide and then the molecular weight and molecular weight distribution were determined by high-speed liquid chromatography (available from Tosoh Corporation). Number average molecular weight (Mn), weight average molecular weight (Mw), Z-average molecular weight (Mz), and Mw/Mm and Mz/Mn ratios are shown in terms of polystyrene equivalent molecular weights.

Thermal analysis was performed as follows: Glass transition temperature (Tg) was determined from duplicate measurements using a differential scanning calorimeter DSC8270 from Rigaku Denki Co., Ltd. by heating from room temperature to 430° C. (at a rate of 10° C./min). In the Examples below, the data determined in Ube Analysis Center are described as, e.g., Tg 389° C. (determined in Ube Analysis Center). Thermal decomposition onset temperature (Tm) was determined by using a differential thermobalance from Rigaku Denki Co., Ltd.

Example 1

The following reaction was performed: (BPDA+2DADE) (4PMDA+2DAT) (PMDA+2DAT). (Procedure) A three-necked separable glass flask equipped with a stainless steel anchor stirrer was connected to an Allihn condenser bearing a water trap. The flask was heated in silicone oil with stirring under a stream of nitrogen gas.

The reactor was charged with 5.88 g (20 mmol) of biphenyltetracarboxylic dianhydride (called BPDA), 8.0 g (40 mmol) of diaminodiphenyl ether (called DADE), 2.0 g (20 mmol) of γ-valerolactone, 3.8 g (46 mmol) of pyridine, 200 g of N-methylpyrrolidone (called NMP), and 35 g of toluene.

The reactor was heated in silicone oil at 180° C. with stirring at 180 r.p.m. for 1 hour under a stream of nitrogen gas. After aft-cooling and stirring for 30 minutes, 17.45 g (80 mmol) of pyromellitic dianhydride (called PMDA), 4.88 g (40 mmol) of diaminotoluene (called DAT), and 109 g of N-methylpyrrolidone (called NMP) were added, and the mixture was stirred at room temperature for 30 minutes.

Then, the reactor was stirred with 4.30 g (20 mmol) of PMDA, 4.88 g (40 mmol) of DAT, and 100 g of NMP at room temperature for 30 minutes, and then heated in silicone oil at 180° C. with stirring at 165 r.p.m. for 4 hours and 25 minutes and the reaction was stopped. A 10% polyimide solution was obtained.

A part of the polyimide solution was applied on a glass plate and heated in an oven at 120° C. for 30 minutes and at 210° C. for 1 hour to prepare a test polyimide film, which underwent thermal analysis. A part of the solution was diluted with dimethylformamide and the molecular weight was determined by high-speed liquid chromatography. No glass transition temperature (Tg) was observed by DSC up to 430° C. Thermal decomposition onset temperature (Tm) was 499° C. Molecular weight was determined. Number average molecular weight (Mn) was 40.700, and weight average molecular weight (Mw) was 87.800.
Weight average molecular weight (Mw)/number average molecular weight (Mn)=2.13; Z-average molecular weight (Mz)/weight average molecular weight (Mw)=1.60.

Example 2

The following reaction was performed: (BPDA+2DADE) (4PMDA+2DAT) (PMDA+DAT+FDA).
(Procedure) The procedure of Example 1 was repeated.
The reactor was charged with 2.94 g (10 mmol) of BPDA, 4.00 g (20 mmol) of DADE, 0.9 g (9 mmol) of valerolactone, 1.8 g (22 mmol) of pyridine, 100 g of NMP, and 35 g of toluene, and heated at 180° C. with stirring at 180 r.p.m. for 1 hour under a stream of nitrogen gas. After stirring at room temperature for 20 minutes, 8.72 g (40 mmol) of PMDA, 2.44 g (20 mmol) of DAT, and 75 g of NMP were added, and the mixture was stirred at room temperature for 20 minutes, and then 2.18 g (10 mmol) of PMDA, 1.22 g (10 mmol) of DAT, 3.47 g (10 mmol) of 9,9-bis(4-aminophenyl) fluorene (called FDA), and 50 g of NMP were added, and the mixture was reacted at 180° C., r.p.m. for 3 hours and 30 minutes under a stream of nitrogen gas. A polyimide solution at a concentration of 10% was obtained.

Analyses were performed in the same manner as described in Example 1.
Thermal decomposition onset temperature (Tm): 503° C.
Molecular weight was determined: Mn: 24.800, Mw: 185.100, Mw/Mn=7.47, Mz/Mw=4.29.

Example 3

The following reaction was performed: (BPDA+2DADE) (4PMDA+2DAT) (PMDA+DAT+HOSO$_2$AB).
(Procedure) The procedure of Example 1 was repeated.
The reactor was charged with 2.94 g (10 mmol) of BPDA, 4.00 g (20 mmol) of DADE, 0.9 g of valerolactone, 1.8 g of pyridine, 100 g of NMP, and 35 g of toluene, and stirred at room temperature for 30 minutes, then reacted at 180° C. and 180 r.p.m. for 1 hour, and then stirred at room temperature for 30 minutes. After stirring with 8.72 g (40 mmol) of PMDA, 2.44 g (20 mmol) of DAT, and 70 g of NMP for 20 minutes, 2.18 g (10 mmol) of PMDA, 1.22 g (10 mmol) of DAT, 2.8 g (10 mmol) of bis(3-amino-4-hydroxyphenyl) sulfone (called HOSO$_2$AB), and 50 g of NMP, and the mixture was reacted at 180° C., r.p.m. for 4 hours and 30 minutes under a stream of nitrogen gas.

Analyses were performed in the same manner as described in Example 1.
Glass transition temperature (Tg): 419-420° C.
Number average molecular weight (Mn): 64.200,
Weight average molecular weight (Mw): 134.00,
Mw/Mn=2.06, Mz/Mw=1.64.

Example 4

The following reaction was performed: (BPDA+2DADE) (4PMDA+2DAT) (PMDA+DAT+m-BAPS).
(Procedure) The procedure of Example 1 was repeated.
The reactor was charged with 2.94 g (10 mmol) of BPDA, 4.00 g (20 mmol) of DADE, 0.9 g of valerolactone, 1.8 g of pyridine, 100 g of NMP, and 35 g of toluene, and heated at 180° C. with stirring at 180 r.p.m. for 1 hour under a stream of nitrogen gas, then stirred at room temperature for 30 minutes, and 8.72 g (40 mmol) of PMDA, 2.44 g (20 mmol) of DAT, and 83 g of NMP were added. After stirring at room temperature for 30 minutes, 2.18 g (10 mmol) of PMDA, 1.22 g (10 mmol) of DAT, 4.32 g (10 mmol) of bis(4-(3-aminophenoxy)phenyl)sulfone (called m-BAPS), and 49 g of NMP were added, and the mixture was heated at 180° C. with stirring at r.p.m. for 3 hours and 30 minutes, and the reaction was stopped.

Analyses were performed in the same manner as described in Example 1.
Thermal decomposition onset temperature Tm: 532° C.
Molecular weight was determined: Mn: 31.900, Mw: 78.700, Mw/Mn=2.47, Mz/Mw=1.72.

Example 5

The following reaction was performed: (BPDA+2DADE) (4PMDA+2DAT) (BPDA+2DAT). (Procedure) A separable glass flask equipped with a stainless steel anchor stirrer was connected to an Allihn condenser bearing a water trap, and the reactor flask was heated in a silicone oil bath with stirring under a stream of nitrogen gas.

The reactor was charged with 2.94 g (10 mmol) of BPDA, 4.00 g (20 mmol) of DADE, 1.0 g of γ-valerolactone, 1.8 g of pyridine, 100 g of NMP, and 35 g of toluene, and heated at 180° C. with stirring at 180 r.p.m. for 1 hour. After stirring at 180 r.p.m. for 20 minutes at room temperature, 8.72 g (40 mmol) of PMDA, 2.44 g (20 mmol) of DAT, and 61 g of NMP were added, and the mixture was stirred at room temperature for 20 minutes, and then 2.94 g (10 mmol) of BPDA, 2.44 g (20 mmol) of DAT, and 50 g of NMP were added, and the mixture was stirred at room temperature for 20 minutes, and then heated in an oil bath at 180° C. with stirring at 180 r.p.m. for 3 hours and 30 minutes, and the reaction was stopped. The reaction solution remained in a liquid state after standing overnight. During thermal analysis by DSC up to 436° C., no glass transition temperature (Tg) was observed.

Thermal decomposition onset temperature Tm: 503° C.
Molecular weight was determined by GPC.
Mn: 36.900, Mw: 102.500, Mw/Mn=2.83, Mz/Mw=1.73.

Example 6

The following reaction was performed: (BPDA+2DADE) (4PMDA+2DAT) (PMDA+DAT+APB).
(Procedure) The procedure of Example 5 was repeated.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene, and heated at 180° C. with stirring at 180 r.p.m. for 1 hour under a stream of nitrogen gas. After stirring at room temperature for 30 minutes, 8.72 g (40 mmol) of PMDA, 2.44 g (20 mmol) of DAT, and 70 g of NMP were added, and the mixture was stirred at 180 r.p.m. for 30 minutes at room temperature. Then, 2.18 g (10 mmol) of PMDA, 1.22 g (10 mmol) of DAT, and 2.92 g (10 mmol) of 1,3-bis(3-aminophenoxy)benzene (called APB) were added, and the mixture was stirred at room temperature for 30 minutes, then heated at 180° C. with stirring at 180 r.p.m. for 4 hours and 30 minutes, and the reaction was stopped. A 10% polyimide solution in NMP was obtained.

Analyses were performed in the same manner as described in Example 1.
Glass transition temperature (Tg): 344-365° C.
Molecular weight was determined: Mn: 18.600, Mw: 119.500, Mw/Mn=6.42, Mz/Mw=2.68.

Example 7

The following reaction was performed: (BPDA+2DADE) (4PMDA+2DAT) (BPDA+DAT+FDA).
(Procedure) The procedure of Example 5 was repeated.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene, and heated at 180° C. with stirring at 180 r.p.m. for 1 hour under a stream of nitrogen gas. After cooling and stirring for 30 minutes, 8.72 g (40 mmol) of PMDA, 2.44 g (20 mmol) of DAT, and 90 g of NMP were added, and the mixture was stirred at room temperature for 30 minutes, and then 2.94 g (10 mmol) of BPDA, 1.22 g (10 mmol) of DAT, 3.94 g (10 mmol) of 9,9-bis(4-aminophenyl)fluorene (called FDA), and 68 g of NMP were added, and the mixture was heated at 180° C. with stirring at 180 r.p.m. for 4 hours under a stream of nitrogen gas. A polyimide solution at a concentration of 10% was obtained.

Analyses were performed in the same manner.
No glass transition temperature was observed by thermal analysis up to 430° C.
Thermal decomposition onset temperature (Tm) was 522° C.
Molecular weight was determined: Mn: 65.500, Mw: 129.300, Mw/Mn=2.00, Mz/Mw=1.66.

Example 8

The following reaction was performed: (BPDA+2DADE) (4PMDA+2DAT) (BPDA+DAT+mBAPS).
(Procedure) The procedure of Example 6 was repeated.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene, and reacted under a stream of nitrogen gas. The reactor was heated at 180° C. with stirring at 180 r.p.m. for 1 hour, and air-cooled and stirred for 30 minutes, then 8.72 g (40 mmol) of PMDA, 2.44 g (20 mmol) of DAT, and 89 g of NMP were added. After stirring at room temperature for 30 minutes, 2.94 g (10 mmol) of BPDA, 1.22 g (10 mmol) of DAT, 4.32 g (10 mmol) of bis(4-(3-aminophenoxy)phenyl)sulfone (called mBAPS), and 50 g of NMP were added, and the mixture was reacted at 180° C. and 180 r.p.m. for 5 hours under a stream of nitrogen gas.

Glass transition temperature (Tg): 327-342° C.
Molecular weight was determined. Mn: 23.000, Mw: 42.800, Mw/Mn=1.86, Mz/Mw=1.61.

Example 9

The following reaction was performed: (BPDA+2DADE) (4PMDA+2DAT) (BPDA+DAT+BAPP).
(Procedure) The procedure of Example 6 was repeated.

The reactor was charged with 2.94 g (10 mmol) of BPDA, 4.00 g (20 mmol) of DADE, 0.9 g of valerolactone, 1.8 g of pyridine, 100 g of NMP, and 35 g of toluene, and heated at 180° C. with stirring at 180 r.p.m. for 1 hour under a stream of nitrogen gas. After air-cooling and stirring for 30 minutes, 8.72 g (40 mmol) of PMDA, 2.44 g (20 mmol) of DAT, and 80 g of NMP were added, and the mixture was stirred at room temperature for 30 minutes, and then 2.94 g (10 mmol) of BPDA, 1.22 g (10 mmol) of DAT, 4.11 g (10 mmol) of 2,2-bis(4(4-aminophenoxy)phenyl)propane (abbreviated as BAPP), and 61 g of NMP were added, and the mixture was stirred for 30 minutes, then heated at 180° C. with stirring at 180 r.p.m. for 4 hours. The resulting product was in a liquid state, but became gelled after standing at room temperature for one week.

Glass transition temperature (Tg): 373-384° C.
Molecular weight was determined: Mn: 77.400, Mw: 155.300, Mw/Mn=2.00, Mz/Mw=1.70.

Example 10

The following reaction was performed: (BPDA+2DADE) (4PMDA+2DAT) (APB).
(Procedure) The procedure of Example 1 was repeated. The reactor was charged with 2.94 g (10 mmol) of BPDA, 4.00 g (20 mmol) of DADE, 1.9 g of γ-valerolactone, 1.9 g of pyridine, 65 g of NMP, and 35 g of toluene. The reactor was heated at 180° C. with stirring at 180 r.p.m. for 1 hour under a stream of nitrogen gas, then air-cooled and stirred for 20 minutes, then 8.72 g (40 mmol) of PMDA, 2.44 g (20 mmol) of DAT, and 40 g of NMP were added, and the mixture was stirred at room temperature for 30 minutes, and then 2.92 g (10 mmol)

of APB and 40 g of NMP were added, and the mixture was heated at 180° C. with stirring at 180 r.p.m. for 4 hours. A polyimide solution at a concentration of 12% in NMP was obtained.

Glass transition temperature (Tg): 349-365° C.
Molecular weight was determined: Mn: 5.400, Mw: 105.200, Mw/Mn=1.95, Mz/Mw=1.72.

Example 11

The following reaction was performed: (BPDA+2DADE) (4PMDA+2DAT) (FDA).
(Procedure) The procedure of Example 10 was repeated.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene, and heated at 180° C. with stirring at 180 r.p.m. for 1 hour under a stream of nitrogen gas. After air-cooling and stirring for 30 minutes, 8.72 g (40 mmol) of PMDA, 2.44 g (20 mmol) of DAT, and 64 g of NMP were added, and the mixture was stirred at room temperature for 20 minutes, and then 3.49 g (10 mmol) of FDA and 30 g of NMP were added, and the mixture was heated at 180° C. with stirring at 180 r.p.m. for 3 hours and 30 minutes. A 10% polyimide solution was obtained.

No glass transition temperature was observed by DSC analysis up to 430° C.

Thermal decomposition onset temperature: 523° C.
Molecular weight was determined: Mn: 51.400, Mw: 121.000, Mw/Mn=2.35, Mz/Mw=1.77.

Example 12

The following reaction was performed: (BPDA+2DADE) (4PMDA+2DAT) (HO—SO$_2$AB).
(Procedure) The procedure of Example 10 was repeated.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene. The reactor was heated at 180° C. with stirring at 180 r.p.m. for 1 hour under a stream of nitrogen gas. After air-cooling and stirring for 30 minutes, 8.72 g (40 mmol) of PMDA, 2.44 g (20 mmol) of DAT, and 58 g of NMP were added, and the mixture was stirred at room temperature for 20 minutes, and then 2.80 g (10 mmol) of HO—SO$_2$AB and 30 g of NMP were added, and the mixture was heated at 180° C. with stirring at 180 r.p.m. for 3 hours and 30 minutes.

Glass transition temperature (Tg): 399° C.
Thermal decomposition onset temperature (Tm): 517° C.
Molecular weight was determined: Mn: 4.700, Mw: 23.100, Mw/Mn=4.86, Mz/Mw=2.11.

Example 13

The following reaction was performed: (BPDA+2DADE) (4PMDA+2DAT) (Siloxane).
(Procedure) The procedure of Example 10 was repeated using diaminosiloxane having an amine value of 457.

The reactor was charged with 2.94 g (10 mmol) of BPDA, 4.00 g (20 mmol) of DADE, 0.9 g of γ-valerolactone, 1.8 g of pyridine, 100 g of NMP, and 35 g of toluene, and heated at 180° C. with stirring at 180 r.p.m. for 1 hour. After air-cooling and stirring for 30 minutes, 8.72 g (40 mmol) of PMDA, 2.44 g (20 mmol) of DAT, and 100 g of NMP were added, and the mixture was stirred at room temperature for 20 minutes, and then 9.14 g (10 mmol) of diaminosiloxane, 45 g of NMP, and 20 g of toluene were added, and the mixture was heated at 180° C. with stirring at 180 r.p.m. for 6 hours. This polyimide is highly adhesive to glass.

Tg was measured (up to 430° C.) but could not be observed.
Thermal decomposition onset temperature (Tm): 468° C.
Molecular weight was determined: Mn: 13.200, Mw: 94.700, Mw/Mn=7.20, Mz/Mw=6.10.

Example 14

Synthesis of a Cyclized/Crosslinked Polyimide
As a reaction example, the following reaction was performed: (BDP+4BPDA+4mDADE) (8PMDA+4DAT) (2BPDA+4DAT).
(Procedure) A three-necked separable glass flask equipped with a stainless steel anchor stirrer was connected to an Allihn condenser bearing a water trap. The flask was heated in an oil bath with stirring under a stream of nitrogen gas at 500 ml/min.

The reactor was charged with 3.54 g (10 mmol) of 1,4-bis (3,5-diaminobenzoyl) piperazine (called BDP), 11.77 g (40 mmol) of BPDA, 1.2 g of γ-valerolactone, 2.6 g of pyridine, and 150 g of NMP, and a half the amount of the solution in the reactor was stirred at 180 r.p.m. in silicone oil at 180° C. for 10 minutes. Then, 8.00 g (40 mmol) of 3,4'-diaminodiphenyl ether (called m-DADE), 50 g of NMP, and 30 g of toluene were added, and the mixture was stirred at room temperature for 15 minutes, then heated at 180° C. with stirring at 180 r.p.m for 1 hour. After stirring at room temperature for 1 hour, 17.45 g (80 mmol) of PMDA, 4.86 g (40 mmol) of DAT, and 200 g of NMP were added, and the mixture was stirred for 20 minutes, then 5.88 g (20 mmol) of BPDA, 4.88 g (40 mmol) of DAT, 108 g of NMP, and 30 g of toluene were added and the mixture was heated at 180° C. with stirring at 180 r.p.m for 5 hours and 10 minutes.

Analyses were performed in the same manner as described in Example 1.

Glass transition temperature (Tg): 380° C. (determined in Ube Analysis Center).

Thermal decomposition onset temperature (Tm): 514° C.
The reaction solution became gelled after standing for several days, and further solidified.

Example 15

The following reaction was performed: (BDP+4BPDA+ 4mDADE) (8PMDA+4DAT) (Siloxane).
(Procedure) The procedure of Example 14 was repeated.

A three-necked glass flask was charged with 1.77 g (5 mmol) of BDP, 5.89 g (20 mmol) of BPDA, 1.5 g of γ-valerolactone, 2.7 g of pyridine, and 100 g of NMP, and stirred at 180 r.p.m. for 20 minutes at room temperature. Then, 4.00 g (20 mmol) of m-DADE, 55 g of NMP, and 35 g of toluene were added, and the mixture was heated at 180° C. with stirring at 180 r.p.m. for 1 hour. After stirring at 160 r.p.m. for 1 hour at room temperature, 8.72 g (40 mmol) of PMDA, 2.44 g (20 mmol) of DAT, and 63 g of NMP were added and the mixture was stirred for 60 minutes, then 9.14 g (10 mmol) of diaminosiloxane (abbreviated as siloxane, molecular weight 914), 70 g of NMP, 1.0 g of pyridine, and 30 g of toluene were added, and the mixture was heated at 180° C. with stirring at 180 r.p.m. for 3 hours and 30 minutes. A low-viscosity imide reaction solution was obtained. This varnish was cast on a glass plate and heated at 120° C. to form a film, which was difficult to separate.

Glass transition temperature was measured but could not be observed (determined in Ube Analysis Center).

Example 16

The following reaction was performed: (BDP+4PMDA+4DAT) (4BPDA+2Siloxane).

(Procedure) The procedure of Example 14 was repeated.

A three-necked flask was charged with 3.64 g (10 mmol) of BDP, 8.73 g (40 mmol) of PMDA, 4.88 g (40 mmol) of DAT, 0.8 g of γ-valerolactone, 1.8 g of pyridine, 150 g of NMP, and 30 g of toluene, and heated at 180° C. with stirring at 180 r.p.m for 1 hour under a stream of nitrogen gas. After stirring at room temperature for 30 minutes, 7.77 g (40 mmol) of BPDA, 17.0 g (20 mmol) of siloxane (molecular weight 850), 60 g of toluene, and 94 g of NMP were added, and the mixture was heated at 180° C. with stirring at 180 r.p.m for 8 hours and 5 minutes. A solution having a polyimide concentration of 15% was obtained and remained stable at room temperature for a long period.

Molecular weight was determined: Mn: 7.800, Mw: 15.900, Mw/Mn=2.04, Mz/Mw=1.80.

Tg was measured but could not be observed.

Example 17

The following reaction was performed: (BDP+4PMDA+4DAT) (4BPDA+2 mTPE).

(Procedure) The procedure of Example 14 was repeated.

A three-necked glass flask was charged with 3.5 g (10 mmol) of BDP, 8.73 g (40 mmol) of PMDA, 4.88 g (40 mmol) of DAT, 0.8 g of γ-valerolactone, 1.6 g of pyridine, 150 g of NMP, and 30 g of toluene, and heated at 180° C. with stirring at 180 r.p.m. for 1 hour. After stirring at room temperature for 1 hour, 7.77 g (40 mmol) of BPDA, 5.85 g (20 mmol) of 1,3-bis(4-aminophenoxy)benzene (called mTPE), 138 g of NMP, and 20 g of toluene were added, and the mixture was reacted at 180° C. and 180 r.p.m. for 6 hours and 30 minutes.

Molecular weight was determined: Mn: 4.4001, Mw: 27.300, Mw/Mn=6.14, Mz/Mw=1.53.

Example 18

Reaction-Type Polyimide Composite
Synthesis of a Linear Polyimide:
Composition: (BPDA+2mDADE) (4PMDA+2DAT) (BPDA+2DAT).

(Procedure) The procedure of Example 5 was repeated.

A three-necked glass flask was charged with 11.76 g (40 mmol) of BPDA, 16.0 g (80 mmol) of m-DADE, 3.0 g of γ-valerolactone, 8.0 g of pyridine, 300 g of NMP, and 65 g of toluene. The flask was heated at 180° C. with stirring at 180 r.p.m. for 1 hour under a stream of nitrogen gas. After stirring at room temperature for 30 minutes, 34.9 g (160 mmol) of PMDA, 9.76 g (80 mmol) of DAT, and 345 g of NMP were added, and the mixture was stirred at 180 r.p.m. for 30 minutes at room temperature. Then, 11.76 g (40 mmol) of BPDA, 9.76 g (80 mmol) of DAT, 200 g of NMP, and 60 g of toluene were added, and the mixture was heated at 180° C. with stirring at 180 r.p.m. for 5 hours and 20 minutes. A 10% polyimide solution was obtained.

Molecular weight was determined: Mn: 22.5001, Mw: 60.300, Mw/Mn=2.68, Mz/Mw=1.74.

No glass transition temperature was observed (up to 430° C.).

Thermal decomposition onset temperature (Tm):503° C.

Example 19

Synthesis of a Reaction Composite of a Cyclized/Crosslinked Polyimide

In the linear polyimide solution at a concentration of 10% shown in Example 18, a reaction for producing the cyclized/crosslinked polyimide (BDP+4PMDA+4DAT) (4BPDA+2Siloxane) was performed.

(Procedure) The reactor shown in Example 1 was charged with ¼ of the amount of the polyimide solution (at a concentration of 10%) shown in Example 18.

Into this solution were added 0.89 g (2.5 mmol) of BDP, 2.18 g (10 mmol) of PMDA, 1.22 g (10 mmol) of DAT, 0.5 g of γ-valerolactone, 1.5 g of pyridine, 40 g of NMP, and 35 g of toluene, and the mixture was heated at 180° C. with stirring at 180 r.p.m for 1 hour. After stirring at room temperature for 1 hour, 2.94 g (10 mmol) of BPDA, 4.57 g (5 mmol) of siloxane (molecular weight 914), 20 g of toluene, and 68 g of NMP were added, and the mixture was stirred for 30 minutes, and then heated at 180° C. with stirring at 180 r.p.m for 3 hours and 50 minutes. A 10% homogeneous solution was obtained. A part of this solution was applied on a glass plate and heated at 120° C. for 20 minutes to give a film, which could be easily separated. A film obtained by further heating at 200° C. for 120 minutes was highly adhesive and difficult to separate.

Glass transition temperature (Tg): 355° C. (determined in Ube Analysis Center).

Molecular weight was determined: Mn: 29.100, Mw: 45.900, Mw/Mn=2.89, Mz/Mw=1.66.

(Ref.) The molecular weight of the cyclized/crosslinked polyimide shown in Example 16 was as follows: Mn: 7.800, Mw: 15.900, Mw/Mn=2.04, Mz/Mw=3.67.

Example 20

A reaction composite of a polyimide was synthesized.

A reaction for producing the cyclized/crosslinked polyimide (BDP+4BPDA+4mDADE) (8PMDA+4DAT) (2Siloxane) was performed using ¼ of the amount of the linear polyimide solution at a concentration of 10% shown in Example 18.

(Procedure) The reactor shown in Example 1 was charged with ¼ of the amount of the polyimide solution shown in Example 18.

Into this solution were added 0.89 g (2.5 mmol) of BDP, 2.94 g (10 mmol) of BPDA, 2.00 g (10 mmol) of m-DADE, 0.5 g of γ-valerolactone, 1.0 g of pyridine, 70 g of NMP, and 30 g of toluene, and the mixture was heated at 180° C. with stirring at 180 r.p.m for 1 hour. After stirring at room temperature for 40 minutes, 4.36 g (20 mmol) of PMDA, 1.22 g (10 mmol) of DAT, and 40 g of NMP were added, and the mixture was stirred at room temperature for 1 hour, and 4.57 g (5 mmol) of siloxane, 20 g of toluene, and 34 g of NMP were added. The mixture was heated at 180° C. with stirring at 180 r.p.m for 4 hours and 30 minutes, and the product was analyzed.

Glass transition temperature (Tg): 355° C. (determined in Ube Analysis Center).

Thermal decomposition onset temperature: 477° C.

Molecular weight was determined: Mn: 17.800, Mw: 51.200, Mw/Mn=2.88, Mz/Mw=2.10.

Example 21

Synthesis of a Mixed-Type Polyimide Composite
(Procedure) The reactor shown in Example 1 was charged with 100 g of the linear polyimide solution (at a concentration of 10%) shown in Example 1.
Composition: (BPDA+2DADE) (4PMDA+2DAT) (PMDA+2DAT).
Molecular weight: Mn: 40.700, Mw: 87.200, Mw/Mn=2.13, Mz/Mw=1.60.
To this solution was added 33 g of the cyclized/crosslinked polyimide (at a concentration of 15%) shown in Example 16.
Composition:(BDP+4PMDA+4DAT) (4BPDA+2Siloxane). Molecular weight: Mn: 7.800, Mw: 15.900, Mw/Mn = 2.04, Mz/Mw =3.67. Both solutions were mixed and heated at 145° C. with stirring at 190 r.p.m. for 90 minutes under a stream of nitrogen gas. The resulting mixed polyimide was a homogeneous solution, which was stable and did not show any gelation phenomenon after standing at room temperature for a long period.
Glass transition temperature (Tg): 370° C. (determined in Ube Analysis Center).
Molecular weight was determined: Mn: 4.400, Mw: 34.000, Mw/Mn=7.73, Mz/Mw=2.23.
The mixed polyimide had a lower Mn and a higher Mw/Mn.

Example 22

Synthesis of a Mixed-Type Polyimide Composite
a) A linear polyimide having the composition (BPDA+2DADE) (4PMDA+2DAT) (BPDA+2DAT) shown in Example 5 was prepared.
The procedure of Example 5 was repeated except that the heating period of the final reaction was 5 hours and 20 minutes instead of 3 hours and 30 minutes.
Molecular weight: Mn: 34.700, Mw: 68.900, Mw/Mn=1.98, Mz/Mw=1.66.
b) The cyclized/crosslinked polyimide (10%) shown in Example 17 in an amount of 50 g was mixed with 100 g of the polyimide solution (10%).
(BDP+4PMDA+4DAT) (4BPDA+2mTPE)
Molecular weight: Mn: 4.400, Mw: 27.300, Mw/Mn = 6.14, Mz/Mw =15.73.
c) The mixed solution was heated at 145° C. with stirring at 190 r.p.m. for 90 minutes under a stream of nitrogen. A homogeneous polyimide solution was obtained. It did not gel after standing at room temperature for a long period.
Molecular weight: Mn: 3.800, Mw: 24.200, Mw/Mn=6.40, Mz/Mw=2.38.
Glass transition temperature (Tg): 381° C. (determined in Ube Analysis Center).
Thermal decomposition onset temperature (Tm): 506° C.

Example 23

Synthesis of a Mixed Polyimide
(Procedure) The procedure of Example 22 was repeated.
a) The reactor was charged with 100 g of the polyimide solution (at a concentration of 10%) shown in Example 22(a).
Composition: (BPDA+2mDADE) (4PMDA+2DAT) (BPDA+2DAT).
b) The cyclized/crosslinked polyimide (at a concentration of 15%) shown in Example 16 in an amount of 50 g was mixed with 100 g of the polyimide solution (15%).
Composition: (BDP+4PMDA+4DAT) (4BPDA+2Siloxane).
Molecular weight: Mn: 7.800, Mw: 15.900, Mw/Mn=2.04, Mz/Mw=3.67.
c) Both solutions were mixed and heated at 145° C. with stirring at 190 r.p.m. for 90 minutes under a stream of nitrogen gas. A homogeneous polyimide solution was obtained. It remained homogeneous and did not gel after standing at room temperature for a long period.
Glass transition temperature (Tg): 365° C. (determined in Ube Analysis Center).
Molecular weight: Mn: 6.600, Mw: 40.500, Mw/Mn=6.16, Mz/Mw=2.10.

Example 24

Synthesis of a Mixed Polyimide
a) The reactor was charged with 135 g of the polyimide solution (at a concentration of 10%) shown in Example 22(a).
b) To the polyimide solution was added 130 g of the cyclized/crosslinked polyimide (at a concentration of 10%) shown in Example 14.
Composition: (BDP+4BPDA+4mDADE) (8PMDA+4DAT) (2BPDA+4DAT).
c) Both solutions were mixed and heated at 145° C. with stirring at 190 r.p.m. for 90 minutes under a stream of nitrogen gas. A homogeneous polyimide solution was obtained.
Glass transition temperature (Tg): 390° C. (determined in Ube Analysis Center).
Thermal decomposition onset temperature (Tm): 511° C.
Molecular weight: Mn: 4.300, Mw: 37.800, Mw/Mn=8.55, Mz/Mw=2.42.

Example 25

Synthesis of a Mixed Polyimide
a) The reactor was charged with 100 g of the polyimide solution (at a concentration of 10%) shown in Example 22(a).
b) To the polyimide solution was added 50 g of the cyclized/crosslinked polyimide (at a concentration of 10%) shown in Example 15.
Composition: (BDP+4BPDA+4mDADE) (8PMDA+4DAT) (2Siloxane).
c) Both solutions were mixed and heated at 145° C. with stirring at 190 r.p.m. for 90 minutes under a stream of nitrogen gas. A homogeneous polyimide solution was obtained. It remained homogeneous and did not gel after standing at room temperature for a long period.
Glass transition temperature (Tg): 373° C. (determined in Ube Analysis Center)
Molecular weight: Mn: 4.600, Mw: 30.000, Mw/Mn=6.56, Mz/Mw=2.07.

The invention claimed is:
1. A process for preparing a cyclized/crosslinked polyimide copolymer produced by a three-step polymerization reaction consisting essentially of (i) mixing and heating 1 molar equivalent of 1,4-bis(3,5-diaminobenzoyl) piperazine (BDP), 4 molar equivalents of biphenyltetracarboxylic dianhydride (BPDA) and 4 molar equivalents of diaminodiphenyl ether (DADE) at 160-200° C. in the presence of a catalyst in an organic polar solvent, to produce product (1), (ii) adding 8 molar equivalents of pyromellitic dianhydride (PMDA) and 4 molar equivalents of diaminotoluene (DAT) to product (1) and heating them to produce product (2), and (iii) (a) adding 2 molar equivalents of BPDA and 4 molar equivalents of DAT, or (b) adding 2 molar equivalents of diaminosiloxane, to product (2) and heating them.

\* \* \* \* \*